Jan. 23, 1951
F. G. BELLEK
2,539,223
DRILL GUIDE
Filed March 29, 1946
2 Sheets-Sheet 1
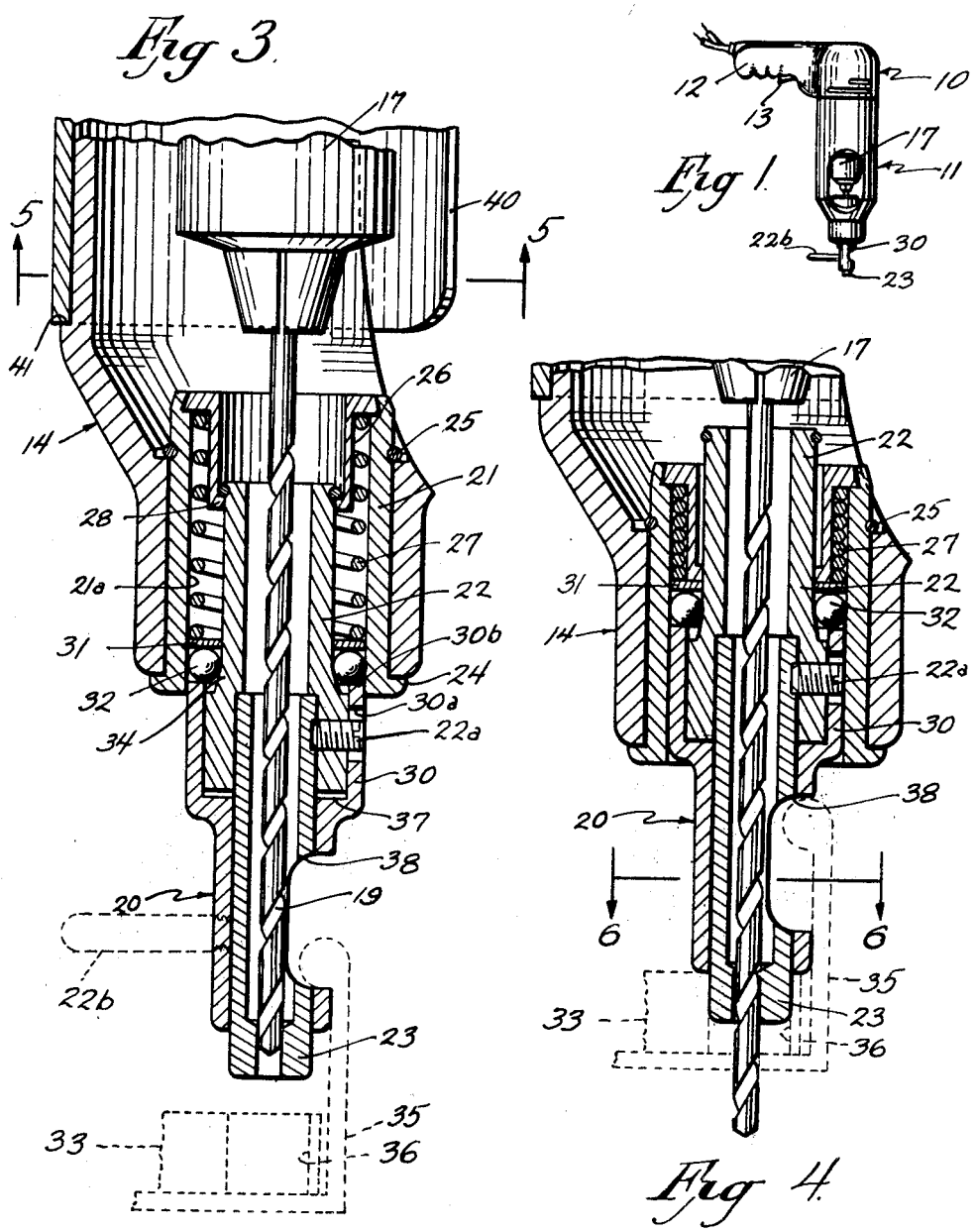
INVENTOR.
Frank G Bellek Jan. 23, 1951    F. G. BELLEK    2,539,223
DRILL GUIDE Filed March 29, 1946    2 Sheets-Sheet 2

INVENTOR.
Frank G Bellek
BY
Watson D Harbaugh
Atty.

Patented Jan. 23, 1951

2,539,223

UNITED STATES PATENT OFFICE 2,539,223

DRILL GUIDE

Frank G. Bellek, Chicago, Ill., assignor of one-half to Harry L. Stillman, Chicago, Ill.

Application March 29, 1946, Serial No. 658,243

8 Claims. (Cl. 77—55)

This invention relates to drill guides and has particular reference to a drill guide adapted to be associated with a drill press, hand drill, or portable drilling machine.

In the art of drilling, the practice of using a jig or template to properly locate the drill with respect to a work piece is well known. When using a jig a hardened steel bushing is usually pressed into a hole provided in the jig for that purpose and the bushing protects the jig against damage when receiving the drill. The bushing also serves to hold the drill so that it rotates about a true axis and as a guide at the right position for a work piece supported by the jig below the bushing. When a template with a great many holes is used as where the work piece is too large to jig, either an excessive number of bushings must be used or a bushing must be manually shifted from hole to hole in the template as the drilling of the work piece at each hole is completed.

In many instances this has been found undesirable and drill guides or bushings which are permanently fixed to the driller have been developed. Most of these guides have been slidably mounted in a housing secured to the body of the driller at one end and surrounding the drill holder or chuck at the other end so that the guide extends slightly beyond the cutting end of the drill when the guide is in a protracted position as held in this position by a spring. When pressed against the work the guide compresses the spring and the drill unsheathes itself through the working end of the guide. A further description of a drill guide of this type will be found in Patent No. 1,831,813 issued to A. Levedahl.

However, the use of this type of drill guide does not overcome certain difficulties encountered in drilling with a template. If the extended guide is lowered toward the template and is not in alignment with the guide locating hole in the template, the end of the guide will strike the template at one side of the hole and the guide will be forced back exposing the point of the drill which will start to bore a hole in the template rather than the work. In the same manner, if the drill is only slightly out of alignment and the drill guide is slightly displaced from the hole in the template, the drill will bore a hole which is not centered in the template hole. Moreover, where drill holes of different sizes are to be drilled with a multiholed template, the work piece is ruined too often by inadvertently drilling a large hole where a small one should be.

One object of this invention, therefore, is to provide a drill guide which will be locked in position enclosing the cutting end of the drill except when the drill is properly positioned with respect to a template or jig to cut a true hole in the desired location.

Another object of this invention is to provide a drill guide which supports the end of a drill of predetermined size against axial displacement during the drilling operation and whose outer surface can be contoured to a predetermined shape to mate with a hole of a mating contour before the drill is permitted to engage the work.

A further object of the invention is to provide a drill guide which extends a predetermined distance beyond a feed releasing shield as a preliminary feeler guide and which is projected deeper into the guide hole when properly located in order to register more solidly with the guide hole to start the drill as where a slight taper upon the drill permits ready locating of the drill guide in an angular hole guide.

Another object of this invention is to provide a drill guide which will prevent the lowering of the drill against the work unless the drill guide is properly inserted into the guide hole of a multiholed template for drill holes of different sizes.

Another object of the invention is to provide a readily operable positioner for a drill guide which is keyed to mate with a guide of predetermined contour so that the mating relationship can be speedily established.

Other objects and advantages of this invention will be apparent in the following specification read in conjunction with the drawings and the appended claims.

Referring to the drawings:

Fig. 1 is an elevational view of a hand drilling machine equipped with an embodiment of this invention ready for operation.

Fig. 3 is a vertical section taken on a plane passing through the axis of the drill of the device shown in Fig. 1, with the drill and chuck shown in elevation.

Fig. 4 is a vertical section similar to Fig. 3 except that the drill guide is retracted in the drilling position with the drill exposed.

Figure 2:
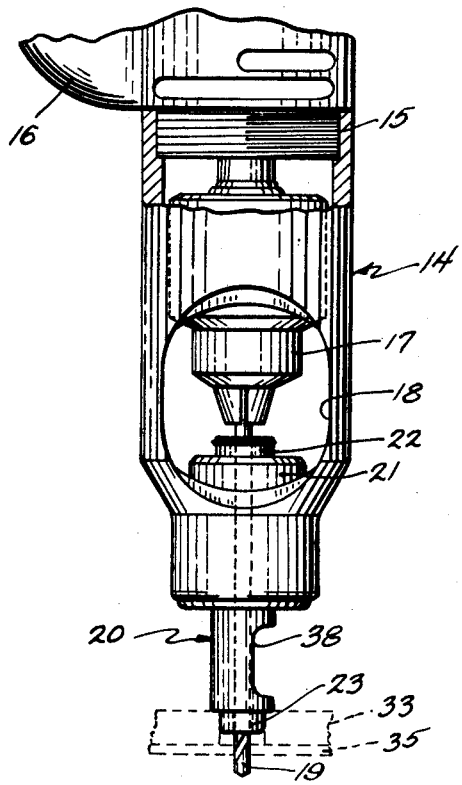
Fig. 2 is an enlarged view partly in section of one embodiment of the invention as attached to an electric hand drill.
Figure 6:
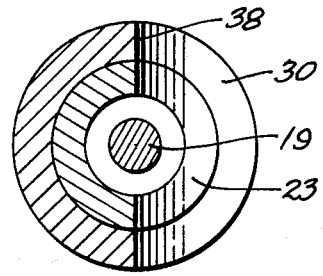
Fig. 6 is a horizontal cross section taken on the line 6—6 of Fig. 4.

In Fig. 1 an embodiment of the invention is shown installed in a portable drilling machine indicated generally at 10 and commonly referred to as an electric hand or portable drill. The drill guide is indicated generally at 11 and forms the forepart of the outer housing of the drilling machine 10 preferably supporting an armature bearing and transmission (not shown). A handle 12 is provided for manipulating the machine and a trigger switch 13 for the forefinger turns the machine on and off as desired. Other methods may be used for mounting embodiments of the invention and another one is shown in Fig. 2 where a suitable adapter 14 is threaded to the front housing 16 of a conventional hand drill as at 15. This method can be used to equip various types of drill presses and other drilling machines (not shown) with this invention.

Since the nonrotating adapter 14 encloses the drill chuck 17, a pair of holes 18 are provided for access to the chuck to enable the operator of the drilling machine to replace the drill 19 from time to time without removing an adapter 14 and drill guide 20.

Referring to Fig. 3 the drill guide 20 comprises a cylindrical housing 21 having a cylindrical inner wall 21a, a release sleeve 30 telescoping in guided relation on the cylindrical wall, a quill 22 supported with an axial lost motion on the sleeve and within the housing 21, a drill bushing 23 which is fixed to the quill 22 as secured by a set screw 22a. The housing 21 is supported within the adapter 14 as located in place by a shoulder 24 on its lower end and a retaining C-spring 25 at its upper end. The set screw 22a is accessible through an elongated slot 30a which permits the lost motion mentioned, and in some embodiments a handle can be provided as indicated in dotted lines 22b for rotating the bushing 23 to any one of a number of positions for purposes of quickly aligning polygonal sections which will be described later in connection with Fig. 7.

A retaining bushing 26 mounted in the upper end of the housing 21 supports the upper end of a compression spring 27 which is carried within the housing 21 and is provided with an internal shoulder 28 on its lower end which serves a dual function, namely, to limit the downward travel of the slidable mounted quill 22 and to serve as a centering guide for the upper end of the quill.

The lower end of the spring 27 bears against a washer 31 which in turn urges a plurality of balls 32 downwardly to wedge them between the inner face 21a of the housing 21 and a taper 34 on the quill 22. Then, whenever the drill guide 11 is not in contact with the template such as indicated in broken lines 33, the balls 32, as wedged between the taper 34 and the inner face 21a locks the quill 22 against upward movement with respect to the housing 21 so that the cutting end of the drill 19 is not exposed beyond the end of the bushing 23.

The balls 32 are released and kept from this wedging or locking relation whenever they are forced upwardly by the sleeve 30, the upper end 30b of the sleeve being disposed in close proximity to the balls to serve as a release dog whenever the lower end of the sleeve is engaged by an element such as the template 33 and driven upwardly. The lost motion provided between the sleeve and bushing permits this drive movement of the sleeve to release the balls.

The bushing and the sleeve are cut out as at 38 to provide an opening through which the drillings or chips and cutting oil may pass. This prevents the drill guides becoming filled with chips. This opening 38 has a further advantage in that holes may be drilled close to overhanging projections such as the beaded edge 39 of the work piece 35 shown in Fig. 3 and Fig. 4.

In operation, once the proper template 33 is positioned over the work piece 35 so that the guide hole 36 in the template corresponds with the desired location of the hole to be drilled, the drilling machine 10 is lowered toward the work 35, and the end of the bushing 23 is inserted into the hole 36. As the machine 10 is lowered, the lower end of the releasing sleeve 30 strikes the template 33 and moves upward with respect to the drill guide 11. The upper end of the releasing sleeve lifts the balls 32 away from the taper 34 on the quill 22 and unlocks the quill 22 and drill bushing 23. Thereafter, further lowering of fthe machine 10 is permitted and a shoulder 37 on the sleeve 30 comes against the lower end of the quill 22 to lift it and the bushing 23 higher and higher with respect to the drill 19 so that the end of the drill 19 is progressively unsheathed to start and complete the drilling cycle.

If the drilling machine 10 is lowered toward the template 33 and is not properly positioned over the hole 36 in the template 33, the end of the drill bushing 23 will strike the template and not the sleeve. As it is attempted to lower the machine 10 further, upward force will be transmitted through the bushing 23 to the quill 22. The taper on the quill 22 will bear against the balls 32 and force them outward locking the quill 22 in the barrel housing 21 so that no amount of pressure on the drill bushing 23 will permit the cutting end of the drill 19 to be unsheathed.

When it is desired to drill a work piece with a number of holes of two or more sizes, embodiments of this invention may be readily adapted so that it will be impossible for an operator to drill a large diameter hole where a small hole should be drilled or vice versa. This is accomplished by counterboring the template holes 36 and changing the length, diameter and/or shape of that portion drill bushing 23 which extends below the releasing sleeve 30.

Figure 7:
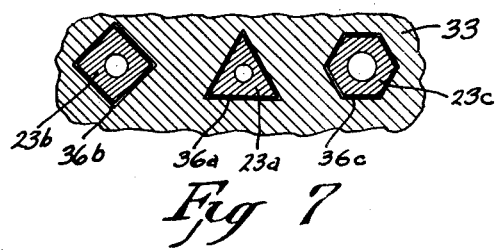
Fig. 7 is a sectional, somewhat schematic view showing of different template hole shapes and mating bushing shapes to prevent drilling a certain sized hole in the wrong place.
Figure 5:
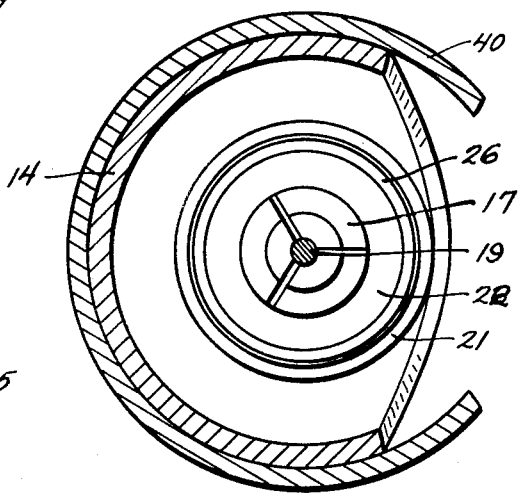
Fig. 5 is a horizontal cross section taken on the line 5—5 of Fig. 3.

For example, if a piece is to be drilled with holes of three different diameters, the template holes preferably are made in different shapes as shown in Fig. 7 so that a bushing correspondingly shaped cannot enter any of the other holes. The smallest diameter holes can be triangular as indicated at 36a. The template holes 36b for the intermediate sized holes can be square, and the template holes 36c corresponding to the largest holes can be hexagonal, the number of sides of the polygonal figuration increasing with the size of the hole to provide adequate stock around the hole.

Therefore, whenever it is impossible to insert the bushing intended for a larger hole in the template hole corresponding to a smaller hole, or whenever the bushing is too long to permit the sleeve to engage the template, the proper location of holes as regards size of drill is very well taken care of by the invention. Moreover it is readily apparent that the bushings can be changed very quickly if only one drilling machine is used, merely by loosening the set screw 22a and changing the drill in the chuck 17.

Referring to opening 18 through which the chuck 17 is accessible, although it is not new to provide a closure to prevent the fingers of an operator becoming mangled, it is new with this invention to place the closure 40 on the outside so that it can be readily rotated to cover the opening or taken off and replaced if damaged. Furthermore, the closure is not a complete one for the opening. It protects against dangers, yet permits lubricant to be introduced to the drill and bushing without opening the closure. Moreover, the door is preferably reticulated to permit circulation of cooling air over the parts. The closure 40 is a semi-cylindrical shell mounted in a wide groove 41 cut around the adapter 14.

Thus from the description provided it will be seen how the objects and results of the invention are attained, and although certain forms and embodiments have been illustrated and described, it will be apparent to those skilled in the art that various changes or modifications may be made without departing from the spirit of the invention whose scope is commensurate with the following claims.

What is claimed is:

1. In a driller, the combination of a supporting element, a rotatable drill, a drill bushing movable axially with respect to the supporting element from a position enclosing the cutting end of said drill to a position exposing said end, resilient means for urging said bushing in one direction with respect to the supporting element so as to enclose the cutting end of said drill, lock means supporting said bushing against relative movement in the opposite direction, and means for releasing said lock means when the releasing means is moved independently of the bushing with respect to said supporting element in said opposite direction to permit exposure of the end of said drill.

2. In a driller, the combination of a supporting element having a cylindrical wall, a drill, bushing means movable from a position enclosing the cutting end of said drill to a second position exposing the end of the drill and having a tapering wall opposing said cylindrical wall, a plurality of balls disposed between said walls, a spring urging said balls into wedging relationship between the walls, and a releasing means for moving said balls out of said wedging relationship when moved initially with respect to said bushing means, said balls locking said bushing means in the first mentioned position when wedged between the walls.

3. In a driller, a drill, bushing means disposed in position to enclose the cutting end of said drill and movable along the axis of the drill to expose the end thereof, means for supporting said bushing means, one of said means having a wall defining a tapering space with respect to an opposing wall upon the other means, a plurality of balls for locking said bushing means disposed between said walls, and means for lifting said balls away from the narrow portion of said tapering space to unlock said bushing means and permit movement thereof to expose the end of said drill.

4. A driller comprising a drill, an elongated sleeve supported on a driller and surrounding the drill, a second sleeve slidably mounted within said elongated sleeve and having a conical surface thereon, resilient means for urging said second sleeve axially with respect to the first sleeve said means including a spring and a plurality of balls, said balls interlocking said sleeves against movement in the opposite direction, a drill bushing attached to said second sleeve and normally enclosing the cutting end of said drill, and a releasing element whose lower end surrounds said drill bushing for lifting said balls away from said conical surface to unlock said sleeves and permit movement of said bushing to expose the end of the drill.

5. In a driller, a drill, a movable bushing for enclosing the end of the drill and a releasable lock for said bushing comprising an element having a tapering wall, a plurality of balls disposed in contact with said wall, resilient means for urging said balls toward the larger end of the tapering wall, an element having a cylindrical wall enclosing said plurality of balls, and means for moving said balls toward the smaller end of the tapering wall, said balls locking said two elements together when moved toward the larger end to prevent exposure of the cutting end of the drill and releasing said elements when moved toward the smaller end to permit exposure of the cutting end.

6. For use with a drilling template having a guide hole, a drill, a guide for the drill comprising a supporting element, a supported element movable with respect to the other element axially of the drill, means for locking the supported element against movement in a direction away from the tip of the drill, means for releasing said locking means when moved in said direction, and bushing means carried by said supported element and extending beyond said releasing means so as to enclose the end of the drill, said bushing means being receivable in the guide hole in the template, and the releasing means coacting with the template to unlock the supported element when the bushing means is received in the hole.

7. For use with a drilling template having guide holes, a drill, a guide for the drill comprising a supporting element, a supported element movable with respect to the other element axially of the drill, means for locking the supported element against movement in a direction away from the tip of the drill, means for releasing said locking means when moved in said direction, and a bushing means carried by said supported element and extending beyond said releasing means to enclose the end of the drill, said bushing means being receivable in one of said guide holes, and the releasing means coacting with the template to release the supported element and permit exposure of the end of the drill when the bushing is inserted in one of the holes.

8. In a driller the combination including a drill, a fixed sleeve surrounding said drill, an inner sleeve carrying a drill bushing, resilient means for urging said inner sleeve and said bushing downwardly, and means for locking said bushing in a downward position enclosing the cutting end of the drill, said means including a conical surface on one of said sleeves, a plurality of balls disposed about said conical surface, a cylindrical surface on the other of said sleeves, and a releasing sleeve surrounding said bushing and extending to a point near the lower end thereof for moving said balls toward the smaller diameter end of said conical surface to release said locking means and permit upward movement of the inner sleeve and bushing to expose the end of said drill.

FRANK G. BELLEK.

REFERENCES CITED

The following references are of record in the file of this patent:

UNITED STATES PATENTS

| Number | Name | Date |
|---|---|---|
| 741,903 | Gates | Oct. 20, 1903 |
| 762,507 | Watt | June 14, 1904 |
| 909,223 | Reynolds | Jan. 12, 1909 |
| 1,031,637 | Fischer | July 2, 1912 |
| 1,237,143 | Allen | Aug. 14, 1917 |
| 1,244,112 | Mackle | Oct. 23, 1917 |
| 2,158,568 | Reynolds | May 16, 1939 |

FOREIGN PATENTS

| Number | Country | Date |
|---|---|---|
| 675,701 | Germany | May 15, 1939 |